US012756239B2

(12) United States Patent
Sagi et al.

(10) Patent No.: US 12,756,239 B2
(45) Date of Patent: Oct. 6, 2026

(54) WIRELESS POWER DISTRIBUTION SYSTEM

(71) Applicant: WI-CHARGE LTD., Rehovot (IL)

(72) Inventors: Ran Sagi, Tel Aviv (IL); Ori Refael Mor, Tel Aviv (IL); Lior Golan, Ramat Gan (IL); Omer Nahmias, Aminadav (IL); Eitan Ronen, Rehovot (IL); Ortal Alpert, Ness Ziona (IL)

(73) Assignee: Wi-Charge Ltd., Rehovot (IL)

( * ) Notice: Subject to any disclaimer, the term of this patent is extended or adjusted under 35 U.S.C. 154(b) by 0 days.

(21) Appl. No.: 15/754,656

(22) PCT Filed: Aug. 24, 2016

(86) PCT No.: PCT/IL2016/050927
§ 371 (c)(1),
(2) Date: Feb. 23, 2018

(87) PCT Pub. No.: WO2017/033192
PCT Pub. Date: Mar. 2, 2017

(65) Prior Publication Data

US 2018/0248411 A1 Aug. 30, 2018

(51) Int. Cl.
*H02J 50/30* (2016.01)
*H02J 50/40* (2016.01)
(Continued)

(52) U.S. Cl.
CPC .............. *H02J 50/30* (2016.02); *H02J 50/40* (2016.02); *H02J 50/80* (2016.02); *H02J 50/90* (2016.02);
(Continued)

(58) Field of Classification Search
None
See application file for complete search history.

(56) References Cited

U.S. PATENT DOCUMENTS 5,771,114 A 6/1998 Anderson et al.
6,437,685 B2 8/2002 Hanaki
(Continued)

FOREIGN PATENT DOCUMENTS

JP 200377086 A 3/2003
JP 2010503368 A 1/2010
(Continued)

OTHER PUBLICATIONS

European Search Report for Appl No. 16838682.9 dtd Dec. 6, 2018, 8 pages.

(Continued)

*Primary Examiner* — Daniel Kessie
(74) *Attorney, Agent, or Firm* — Maine Cernota & Curran

(57) ABSTRACT

A system for transmission of power into a space, comprising one or more transmitters and several portable receivers which can receive power transmitted. Receivers can transmit data back to transmitters regarding their power needs, based on the state of charge of their batteries. A transmission protocol exists whereby each transmitter can detect legitimate receivers within its field of view and transmit a first amount of energy to any such receiver, which may report receiving that energy back to a transmitter, together with data relating to its power needs. Transmitters can deny power transmission to some receivers based on the data received from a reporting receiver. The first amount of energy transmitted may be used to power up a sleeping receiver, before transmission of useful amounts of power, if allowed by the protocol. Other aspects of the transmission protocol relate to the division of available power between requesting receivers.

11 Claims, 5 Drawing Sheets

(51) Int. Cl.

| | |
|---|---|
| ***H02J 50/80*** | (2016.01) |
| ***H02J 50/90*** | (2016.01) |
| ***H04B 10/80*** | (2013.01) |
| *H02J 7/42* | (2026.01) |
| *H02J 7/47* | (2026.01) |

(52) U.S. Cl.
CPC .............. *H04B 10/807* (2013.01); *H02J 7/42* (2026.01); *H02J 7/47* (2026.01)

(56) References Cited

U.S. PATENT DOCUMENTS

| | | | | |
|---|---|---|---|---|
| 6,687,036 | B2 | 2/2004 | Riza | |
| 7,133,617 | B2 | 11/2006 | Oettinger | |
| 9,939,512 | B1 * | 4/2018 | Amir | G01S 1/72 |
| 2002/0000792 | A1 | 1/2002 | Hanaki | |
| 2002/0071627 | A1 | 6/2002 | Smith | |
| 2004/0142733 | A1 * | 7/2004 | Parise | B60L 53/11 455/572 |
| 2004/0266367 | A1 * | 12/2004 | Tuominen | H04B 10/807 455/91 |
| 2006/0266917 | A1 * | 11/2006 | Baldis | H01Q 3/46 250/200 |
| 2008/0304826 | A1 | 12/2008 | Sochava | |
| 2010/0078995 | A1 * | 4/2010 | Hyde | H02J 50/40 307/11 |
| 2010/0079008 | A1 | 4/2010 | Hyde et al. | |
| 2010/0320362 | A1 | 12/2010 | Alpert | |
| 2012/0007445 | A1 | 1/2012 | Hyde | |
| 2012/0326660 | A1 * | 12/2012 | Lu | H02J 50/20 320/108 |
| 2013/0234661 | A1 * | 9/2013 | Yang | H02J 50/80 320/108 |
| 2013/0264870 | A1 | 10/2013 | Keysar | |
| 2013/0328417 | A1 * | 12/2013 | Takeuchi | H02J 50/80 307/149 |
| 2014/0092929 | A1 | 4/2014 | Alpert | |
| 2014/0175876 | A1 | 6/2014 | Cheatham, III et al. | |
| 2014/0368050 | A1 | 12/2014 | Chun et al. | |
| 2015/0141086 | A1 * | 5/2015 | Chan | H02J 50/30 455/575.1 |
| 2015/0270900 | A1 * | 9/2015 | Hilario | H04B 10/40 398/140 |
| 2016/0197494 | A1 * | 7/2016 | Kwon | H04B 5/0037 307/104 |

FOREIGN PATENT DOCUMENTS

| | | | |
|---|---|---|---|
| JP | 2010510766 | A | 4/2010 |
| WO | 2007036937 | A2 | 4/2007 |
| WO | 2008063678 | A1 | 5/2008 |
| WO | 2009083990 | A2 | 7/2009 |
| WO | 2012111271 | A1 | 8/2012 |
| WO | 20120111271 | A1 | 8/2012 |
| WO | 2014200752 | A1 | 12/2014 |

OTHER PUBLICATIONS

PowerStance Equine Products; http://stanceequine.co.uk/product-powerstance.

Gomes et al; Does Medium Chain Triglyceride Play an Ergogenic Role in Endurance Exercise Performance?; Institudo de Ciencias Biomedicas—USP; Rev Bras Med Esporte—vol. 9. No 3—Mai/Jun. 2003, 8 pages.

Johanna Maria Hallebeek; Dietary Control of Equine Plasma Triacylglycerols; ISBN 9039329826, University, The Netherlands, 2002, 144 pages.

Adefila et al; Characterization of an a-amylase from sorghum (Sorghum bicolor) obtained under optimized conditions; J. Inst. Brew. 2012; 118: 63-69, 8 pages.

Martin et al; Chromium Picolinate Supplementation Attenuates Body Weight Gain and Increases Insulin Sensitivity in Subjects with Type 2 Diabetes; Diabetes Care, vol. 29, No. 8, Aug. 2006, pp. 1826-1832, 7 pages.

Bertoft et al; Effect of pH, Temperature, and Calcium Ions on Barley Malt α-Amylase Isoenzymes; J. Inst. Brew. Sep.-Oct. 1984, vol. 90, pp. 298-302, 6 pages.

International Search Report and Written Opinion of International Application No. PCT/IL2016/050927, dated Dec. 15, 2016, 9 pages.

Office Action for U.S. Appl. No. 16/111,192, dated Jul. 8, 2020, 20 Pages.

European Office Action for EP Application No. 16838682.9, dated Nov. 25, 2019, 3 pages.

European Office Action for EP Application No. 16838682.9, dated Mar. 15, 2021, 3 pages.

English translation of Japanese Office Action for JP Application No. 2018-510062, dated Aug. 18, 2020, 3 pages.

English translation of Chinese Office Action for CN Application 201680060250.1, dated Dec. 30, 2020, 8 pages.

Japanese Office and English Translation for Patent Appl. No. JP2018-510062, dated Jul. 27, 2021, 7 Pages.

Japanese Office and English Translation for Patent Appl. No. JP2018-510062, dated Mar. 23, 2022, 16 Pages.

Translation of Korean Office Action in KR Application No. 10-2018-7008377 dated Apr. 23, 2023, 6 pages.

Translation of Japanese Office Action in Application No. 2022-120411, dated Oct. 24, 2023, 2 pages.

Translation of Korean Office Action in KR Application No. 10-2018-7008377 dated Feb. 29, 2024, 4pages.

Translation of Office Action in JP Application No. 2022-120411 dated Jul. 24, 2024, 2 pages.

Translation of Dismissal Decision for Amendment in JP Application No. 2022-120411 dated Mar. 29, 2025, 2 pages.

Translation of Decision of Rejection in JP Application No. 2022-120411 dated Mar. 11, 2025, 1 page.

* cited by examiner

WIRELESS POWER DISTRIBUTION SYSTEM

RELATED APPLICATIONS

This application is a national phase application filed under 35 USC § 371 of PCT Application No. PCT/IL2016/050927 with an International filing date of Aug. 24, 2016, which claims priority of U.S. Provisional Patent 62/208,878 filed Aug. 24, 2015. Each of these applications is herein incorporated by reference in its entirety for all purposes.

FIELD OF THE INVENTION

The present invention relates to the field of wireless power beaming, especially as applied for use in a laser based transmission system to beam optical power in a domestic environment to mobile electronic devices.

BACKGROUND

There exists a long felt need for the transmission of power to a remote location without the need for a physical wire connection. This need has become important in the last few decades, with the popularization of portable electronic devices operated by batteries, which need recharging periodically. Such mobile applications include mobile phones, laptop computers, cars, toys, wearable devices and hearing aids. Presently, the capacity of state-of-the-art batteries and the typical battery use of an intensively used smart phone may be such that the battery may need charging more than once a day, such that the need for remote wireless battery recharging is important.

Battery technology has a long history, and is still developing. In 1748 Benjamin Franklin described the first battery made of Leyden jars, the first electrical power source, which resembled a cannon battery (hence the name battery). Later in 1800, Volta invented the copper zinc battery, which was significantly more portable. The first rechargeable battery, the lead acid battery, was invented in 1859 by Gaston Planté. Since then the energy density of rechargeable batteries has increased approximately 8 times, and is still increasing. FIG. 1 of U.S. Pat. No. 9,312,701 having common inventors with the present application, and incorporated herein by reference in its entirety, shows the energy density, both in weight and volume parameters, of various rechargeable battery chemistries, from the original lead acid chemistry, to the present day lithium based chemistries, and the zinc-air chemistry. At the same time the power consumed by portable electronic/electrical devices has reached a point where several full battery charges may need to be replenished each day.

Almost a century after the invention of the battery, in the period between 1870 and 1910, Tesla attempted the transmission of power over distance using electromagnetic waves. Since then, many attempts have been made to transmit power safely to remote locations, which can conveniently be characterized as being over a distance significantly larger than the size of the transmitting or receiving device. This ranges from NASA, who conducted the SHARP (Stationary High Altitude Relay Platform) project in the 1980s to Marin Soljacic, who experimented with Tesla-like systems in 2007.

Yet, to date, only three commercially available technologies allow transfer of power to mobile devices safely without wires namely:

1. Magnetic induction—which is typically limited in range to just several mm.

2. Photovoltaic cells—which cannot produce more than 0.1 Watt for a cell having a size suitable for mobile phones, when illuminated by either solar light or by available levels of artificial lighting in a normal, safely lit room.
3. Energy harvesting techniques—which convert RF waves into usable energy, but cannot operate with more than 0.01 W in any currently practical situation, since RF signal transmission is limited due to health safety and FCC regulations.

At the same time, the typical battery of a portable electronic device has a capacity of between 1 and 100 Watt*hour, and typically requires a daily charge. Consequently, a much higher level of power transfer at a much longer range is needed.

A few attempts to transfer power in residential environments, using collimated or essentially collimated, electromagnetic waves, have been attempted. However, commercial availability of such products to the mass market is limited at the current time, principally because of the problem outlined in the following paragraphs.

One of the problems that inhibit the adoption of such wireless power solutions is the inability to support multiple clients. Typically such a wireless power solution covers a certain volume around the transmitter (sometimes known as field of view, or FOV), in which it is able to charge receivers. As the range of such wireless power supply systems increases, the potential number of clients within the field of view may become larger, and there may also be different types of clients. In an environment where multiple clients can be powered by a single transmitter, there is a need to optimize the power transmission to guarantee maximal performance, to improve efficiency, and to prevent supply to a client with too much or too little power. In addition, there exists the goal of economic profit from such power transmission.

The prior art typically ignores or provides limited solutions to this problem, solutions that do not encompass the full scope of the problem and are not suitable for a commercial system supporting different types of clients with different and varying needs.

Another problem with the prior art may arise in an environment where the fields of view of multiple transmitters overlap in space. If a receiver would be placed inside such an overlapping field of view, it may receive power from more than one transmitter, potentially supplying it with more power than it can handle.

The prior art also does not provide a method to verify the legitimacy of receivers. Illegitimate receivers, which may not be equipped to safely handle the optical or electrical power supplied to them, may pose a safety hazard. There is a need for a method of verifying the legitimacy and safety of the receivers to which the transmitter is transmitting.

Many prior art receivers also do not allow a zero energy shutoff mode, and this deficiency may drain the battery unnecessarily when no transmitter is present. This arises because in such prior art systems, receivers may periodically need to interrogate for the presence of accessible transmitters, and if none are available in the vicinity, this continual periodic interrogation represents a continual drain of power from the receiver.

One example of this may be found in U.S. Pat. No. 8,525,097 for "Wireless Laser Power Transmitter", and having a co-inventor with the present application, where the receiver needs to generate a thermal lens to an element, by applying heating, in order for charging to commence. Other examples can be found in U.S. Pat. Nos. 8,159,364, 8,446, 248, 8,410,953, and also in US 2013/0207604 where, in all of these related references, an algorithm for establishing a link between the receiver and transmitter begins with the statement "An exemplary algorithm of control logic 310 for system 100*a* might be as follows: (1) the power receiver 330 can use the communications channel 110*a* to declare its presence to any transmitters 330*a* in the vicinity"

There is therefore an unmet need to transfer electrical power, over a range of a few meters or more, safely, to portable electronic devices which are generally equipped with a rechargeable battery. The system should also enable true zero energy shutdown mode without draining the battery, while still maintaining the capability to detect legitimate receivers.

The disclosures of each of the publications mentioned in this section and in other sections of the specification, are hereby incorporated by reference, each in its entirety.

SUMMARY

One exemplary embodiment of the systems described in this disclosure includes at least one transmitter, capable of power transmission to a subset of receivers, and of detection of receivers in a scan feature, and at least one receiver, capable of receiving power and/or of transmitting a minimal identification (ID) transmission using less than a first minimum level of energy supplied by the transmitter, when the at least one transmitter and at least one receiver are within a mutual field of view of each other. That "first minimum level of energy supplied by the transmitter" is understood to mean that the battery of the receiver does not suffer constant charge loss while it is searching for a possible non-existent transmitter, as happens in prior art systems, since it will always receive more energy from the transmitter asking for it to transmit its ID, than it expends in transmitting its ID, and since there is no need to spend any energy before the first minimum level of energy is received. This initial energy expenditure may typically provide for the energy budget to wake up the receiver, to detect that a real trigger has been received, to do a quick system analysis and to send out the initial message.

The minimum ID transmission should comprise two parts—one part which defines the identity of the receiver, and the other part which defines both the requirements of the energy it needs to receive from the transmitter, and the capability of the receiver to accept and handle the energy it can receive from the transmitter. Further details are given later in the disclosure. The transmitter may be able to determine some of the values from knowledge of the characteristics of the receiver whose identity or model number is known. For example, the transmitter may be programmed to interpret a certain model as having a certain aperture and power handling capabilities, even though these values may not be specifically detailed in the minimum ID transmission.

Such a "handshake" process has a few additional advantages, for example, each transmitter is capable of supplying power which is less than or equal to some maximal power capability, which depends on the transmitter design and configuration, and each receiver is capable of supplying power within some limitations, to the device with which it is associated, which may also have limitations on its ability to receive that power. One objective of the methods of the current disclosure is to establish a safe and efficient charging scheme that will satisfy all the different requirements, in a method which is simple to execute, both for the handshake procedure and to commence the power transmission.

The methods described in the present disclosure consist of several processes that may be performed in series or in parallel, and which may input and output data to and from transmitter(s) to receiver(s) and from receiver(s) to transmitter(s).

A first process is the scan process. The scan process is typically performed by the transmitter, and its goal is to determine a list of receivers that are positioned within the field of view of each transmitter. The scan may be done by using a scanning beam, or some communication process with the receivers such as RF, Ultrasound, IR, manual entry, Bluetooth™, Zigbee™ Wifi™ or TCP/IP, Z-Wave™, Ant™, or any other suitable communication means. The scanner within the transmitter may be operated continuously or from time to time, and should be configured to detect and report the presence of in-range receivers.

Receivers may also be capable of complete shutdown, consuming no energy when power is not transmitted to them. When a receiver is detected the transmitter may supply it with at least a first minimum energy which is predetermined to be enough to power up the receiver and allow it to report its Minimum ID—which will be defined later in this disclosure—to the transmitter via the communication means mentioned earlier, or via a proxy server.

Although the methods and system configurations described in this disclosure may be used with any form of wireless power transmission, such as RF, magnetic (if practical for such a range), electromagnetic, or optical, the use of optical power transmission is used as an example in this disclosure to illustrate the various different aspects and implementations of the methods and systems proposed. It is to be understood however, that the invention is not meant to be limited to optically implemented power transmission, but is meant to cover any suitable power transmission system.

The transmitter may qualify the receiver as a "potentially legitimate receiver", namely a receiver that is probably certified to be capable of safely receiving power by an optical method.

There are a few such optical methods, a partial list of which includes

1. The receiver may be equipped with an identifying pattern, such as a barcode or a unique structure, that may be verified by the transmitter, either by scanning it with a scanning beam or using a camera and signal processing.
2. The receiver may include a special filter, or filter set, that may transmit/block certain wavelengths to provide such identification data.
3. The receiver may be equipped with a hologram of a barcode or other unique pattern, or a few such barcodes or unique patterns viewable using different wavelengths, that may be used to verify the receiver
4. The receiver may be equipped with another unique optical feature, such as a distinctive reflection, which may involve the level of optical power, a spatial pattern, a pattern involving special wavelengths, a glossy pattern or a hazy, or any other form of identification, whether a reflective, diffusive, or spectrally shifted pattern that allows the transmitter to identify it.
5. The receiver may be equipped with a retroreflector, to return illumination received from a transmitter back to the transmitter, the reflection being used as an identifying patter, as in option 1 above.

After a receiver is detected, which may not be immediately, the transmitter may supply the detected receiver with at least the above-mentioned first minimal energy allotment, which is predetermined to be enough to enable the receiver to transmit a minimal ID back to the transmitter.

After receiving the minimal ID from the receiver, which may be in the form of reflecting a specific optical pattern from the receiver, or a communication including an identifier, the transmitter determines the initial charging requirement (ICR) for the receiver. The initial charging requirements (ICR) may be either based on an internal database in the transmitter, an internal algorithm known to the transmitter or on data received from the receiver itself or from an external server.

The ICR may be dependent on, but is not limited to, one or more of:

1. Receiver ID
2. Receiver manufacturer ID
3. Receiver model identifier
4. Maximum average electrical power that can be processed by the receiver
5. Minimum average electrical power that can be processed by the receiver
6. Power channels available for the receiver, which may include data such as the wavelengths to which the receiver is sensitive, power technologies to which the receiver may be sensitive, (e.g. RF, magnetic fields, electric fields, ultrasound), transmission protocols, frequency, duty cycle, payment methods, or a combination thereof
7. Maximum momentary electrical power that can be processed by the receiver
8. Minimum momentary electrical power that can be processed by the receiver
9. Total energy that can be received by the receiver and/or by the client device (which is the device to which the receiver supplies power, typically a mobile phone or another electronic circuit which is not part of the receiver)
10. Maximum average optical power that can be processed by the receiver
11. Minimum average optical power that can be processed by the receiver
12. Maximum momentary optical power that can be processed by the receiver
13. Minimum momentary optical power that can be processed by the receiver
14. Receiver's power conversion efficiency
15. Receiver state—which may include
    a. Power needs
    b. Battery charging data (charging capacity, temperature)
    c. Energy used by device
    d. Urgency indicator
    e. Available power sources
16. Receiver class, for example—high priority, medium priority, low priority
17. Receiver clear aperture
18. Receiver field of view
19. Receiver-required safety class, since, for instance, receivers intended for residential use may be limited to reduced power levels compared to industrial ones
20. Receiver public key
21. Receiver address on a network
22. Data transmitted from receiver's client, which may be the unit receiving the data
23. A cyclic redundancy check (CRC) or other checksum data or error correction code
24. Electronic signature of the whole message.

The receiver may compute the electronic signature based on data received from an external source to the receiver and a private key which may be preloaded into the receiver and not transmitted. The electronic signature may be used to verify the device ID, manufacturer ID and other data transmitted in the message.

Based on the data received from some or all the receivers, the transmitter determines the transmission profile for each receiver. This may be done using one or more of the following methods:

1. Equal supply of power to all clients such that each client is scheduled to receive the same amount of transmitted power, although the received power may differ due to different structure and operating conditions for different receivers. Such power is calculated based on the total amount of power the transmitter is capable of transmitting (taking into account errors/scan/movement between receivers), divided by the total number of receivers.
2. The first receiver to demand power may receive power according to the lesser of its power request and the maximum power transmission of the transmitter.
3. Random power delivery, while at the same time, removing from the receiver candidate list, clients that have fulfilled their power needs.
4. A method based on a profile received from either an internal calculation, a receiver or from an external server.

The calculation of power transmission profile may be calculated based on at least one of:

1. The needs of each receiver
2. The power transmission capability between each transmitter and each receiver
3. The availability of different transmitters and different receivers
4. The power needs of each receiver
5. The status of each receiver, including but not limited to battery capacity, charging capacity power needs, and subscriber payment information
6. A predetermined list
7. The identity of each receiver
8. The safety of transmission to each receiver In general the transmission from a transmitter to a receiver is limited to the minimum of:

1. The power transmission capabilities of the transmitter
2. The power reception capabilities of the receiver
3. The power reception capabilities of the client
4. The safety power limit A feedback loop may be provided between receivers and transmitters to update the status of the receiver from time to time and the transmission schedule may be revised based on such status.

The transmission schedule may also be revised based on the addition of new receivers to the list, subtraction of receivers from the list, addition of new transmitters to the list, subtraction of transmitters from the list, and change in other parameters such as time, environmental conditions, receiver position, and safety requirements.

There is thus provided in accordance with an exemplary implementation of the devices described in this disclosure, a system for transmission of power into a remote volume, the system comprising:

(i) at least one transmitter having a field of view, and capable of receiving data transmitted from the field of view to the at least one transmitter, and (ii) at least one receiver capable of receiving energy from the at least one transmitter and transmitting data back thereto, wherein the at least one transmitter is configured to detect receivers within its field of view and to safely transmit a first amount of energy to at least one of the receivers, and the at least one receiver is configured to receive the first amount of energy from the at least one transmitter and respond with a data transmission to the at least one transmitter, and the at least one transmitter is configured to deny power transmission to some of the receivers based on the data received from the at least one receiver.

In such a system, at least one receiver may have an identifying pattern which can be detected by the transmitter in order to qualify the receiver as a potentially legitimate receiver. In such a case, the identifying pattern may be optical. In either of these situations, the identifying pattern may result from a retroreflection from at least one receiver.

Furthermore, in any of the above described systems, at least one of the receivers may comprise at least one filter causing it to be capable of receiving power from transmitters matching a characteristic of the at least one filter.

According to another implementation of the above-described systems, the at least one transmitter may be adapted to transmit power to at least one of the receivers, the power being at a level which is less than the power reception capabilities of the receiver, and less than the power reception capabilities of the receiver's power client(s) and less than the maximal safe power transmission limit of the transmitter.

Additionally, the transmitter may be adapted to determine a transmission profile of power to be transmitted, based on data received from at least one of the receivers. In that case, the transmission profile may be generated from an algorithm processed in the at least one transmitter, or in a device in communication therewith.

In yet more implementations of the systems of this disclosure, the at least one transmitter may be at least two transmitters, and at least one of the receivers may be adapted to report its power needs to both or all of the at least two transmitters, so that the sum of all power needs requested does not exceed the maximal power handling capabilities of the receiver.

BRIEF DESCRIPTION OF THE DRAWINGS

The present invention will be understood and appreciated more fully from the following detailed description, taken in conjunction with the drawings in which.

DETAILED DESCRIPTION

Figure 1:
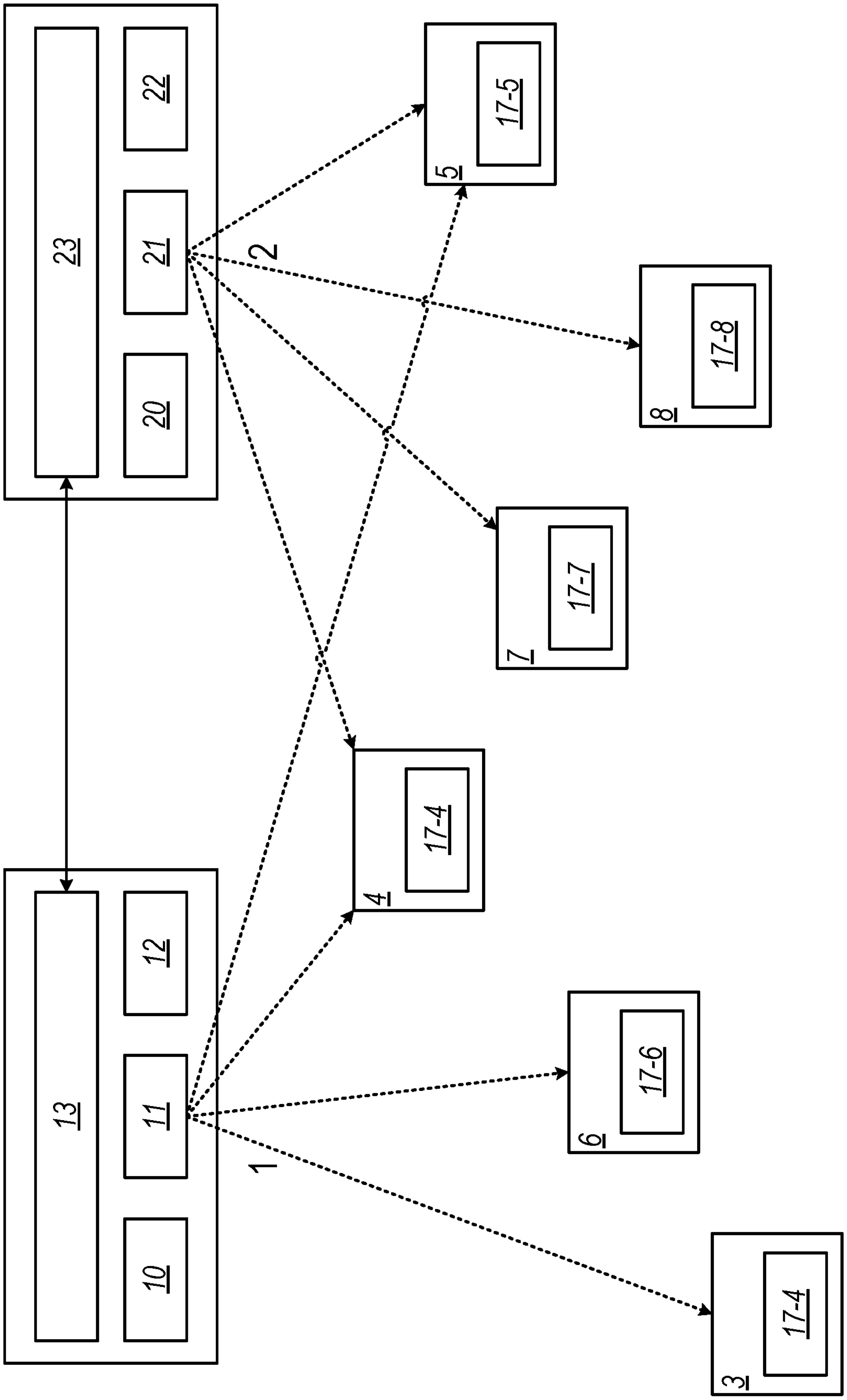
FIG. 1 shows an exemplary power transmission system comprising a number of transmitters and a number of receivers.

Reference is now made to FIG. 1 which shows one exemplary configuration of a system incorporating a pair of transmitters 1 and 2, and a number of receivers, 3 to 8, some of which are can receive power from only one or other of the transmitters, and some of which can receive power from both.

Transmitter 1 incorporates a controller 13, a scanner 10, a power source emitting a power beam 11, and a communications unit 12. Transmitter 2 incorporates a controller 23, a scanner 20, a power source emitting a power beam 21, and a communications unit 22.

In a first stage of operation transmitter 1 scans its field of view and detects receivers 3, 4, 5 and 6. It does not detect receivers 7 and 8 which are outside of its field of view in this exemplary scenario, because they are blocked by receiver 4.

On detecting receivers 3, 4, 5 and 6, transmitter 1 supplies each with a first minimal energy allotment. Supplying each receiver with a first minimal energy lot, awakens the receivers and causes them to transmit ID transmission, using communication modules 17-3, 17-4, 17-5 and 17-6, which are incorporated within their respective receivers. The ID transmission may typically consist of a partial set of the following data, generally divided into two parts, one relating to the identity of the receiver itself, and the other relating to the receiver's ability to receive and use the energy beamed to it from the transmitter. Obviously, the receiver ID itself will also include some of the energy capability data by implication from the properties of that type of receiver. Other data not listed here may also be involved:

1. Receiver ID
2. Receiver manufacturer ID
3. Receiver model identifier
4. Maximum average electrical power that can be processed by the receiver
5. Minimum average electrical power that can be processed by the receiver
6. Power channels available for the receiver
7. Maximum momentarily electrical power that can be processed by the receiver
8. Minimum momentarily electrical power that can be processed by the receiver
9. Total energy that can be received
10. Maximum average optical power that can be processed by the receiver
11. Minimum average optical power that can be processed by the receiver
12. Maximum momentarily optical power that can be processed by the receiver
13. Minimum momentarily optical power that can be processed by the receiver
14. Receiver's power conversion efficiency
15. Receiver state—which may include
    a. Power needs
    b. Battery charging data (charging capacity, temperature)
    c. Energy used by device
    d. Urgency indicator
    e. Available power sources
16. Receiver class (for example high priority, medium priority, low priority)
17. Receiver clear aperture
18. Receiver field of view 19. Receiver required safety class (residential receivers may be limited to reduced power levels compared to industrial ones)
20. Receiver public key
21. Receiver address on a network
22. Data transmitted from receiver's client (the unit receiving the data)
23. CRC or other checksum data
24. Electronic signature of the whole message.

Transmitter 1 determines if it is capable of transmitting power to each receiver, which may be done based on any data received, but especially based on at least one of device ID, manufacturer ID, power capabilities, power needs, safety class, clear aperture, data from the client, receiver class, receiver model, receiver's alternative power sources and electronic signature.

According to one exemplary implementations of the methods and systems of the present disclosure, some receivers, such as receivers 4 and 5 may report to a different transmitter, such as transmitter 2, as an alternative power source, which may generate a negotiation process between transmitters 1 and 2, or between transmitters 1 and 2 and receivers 4 and/or 5, or any other proxy, to determine which transmitter should power which receiver. Typical criteria of procedures for making these decisions could include a transmitter determining its incapability of power transmission if the beam parameters which it is capable of generating, do not match the reception parameters of the receiver. For example, a transmitter capable of emitting a 15 mm beam, should not try to power a receiver which is capable of receiving 5 mm beams only. Similarly, a transmitter should not try to beam power to a receiver, which is greater than the power level which the receiver is capable of safely receiving.

A specific negotiation may develop along the following lines, though it is to be understood that these just describe a typical scenario, and that alternative procedures may also be used. First a transmitter scans the field of view, and detects a receiver.

The first transmitter sends a minimal amount of energy to the receiver.

The receiver responds with a minimal ID message typically comprising the physical ID, manufacturer, beam and safety parameters, and an indication if the receiver is currently being powered by a second transmitter, and if so, the second transmitter's ID.

The first transmitter determines, based on the minimal ID message, if it is capable of transmitting power to the receiver.

The first transmitter communicates such a capability to the receiver

The receiver calculates if it is capable of safely receiving an amount of additional power from the first transmitter.

The receiver requests such an additional amount of power from the first transmitter.

The receiver may inform the second transmitter of its ability to receive power from the first transmitter The receiver may reduce the amount of power it requests from the second transmitter.

In a different implementation of the current systems, receivers 4 and 5, for instance, may report their maximal power handling capabilities taking into account the power received from transmitter 2, if any.

The scanner, communication and power beaming of each of the transmitters may be done by the same apparatus, such as a scanning laser beam, but may also be done using a camera or other electronic or optical means of receiver detection.

After transmitter 1 has determined the power needs of each of receivers 3, 4, 5 and 6, it may create an electronic record for each receiver, which may include the receivers' ID, position, power needs, safety class and other data.

Based on this data, transmitter 1 may then determine the transmission schedule, i.e. what power is to be transmitted to what receiver at what time, and may then execute that scheduled transmission program. During execution the transmitter may request a status update, either by a scanning operation or by special request to the receivers, and may change the transmission schedule in response thereto.

There are a number of possible methods of determining the presence of two transmitters covering the same receiver, and the way in which the system deals with this situation. Each method is now prefaced with a short description of its functional outline, as follows:

Method A—User responsibility with minimal technical input—the instruction manual of the transmitter advises against the positioning of two transmitters so that their field of views overlap.

Method B—Active user responsibility—each receiver will pair with a single specific transmitter only—pairing being done by the user.

Method C—Receiver responsibility 1×1—A receiver will be configured to pair with only one transmitter; the receiver may choose the optimum transmitter or the first transmitter. The optimum transmitter may be determined by power level, safety, cost, user interface or any other parameters.

Method D—Receiver responsibility 1×n—The receiver will report its power needs to all transmitters, making sure it does not receive more power than it can handle.

For instance, it may report its power needs to the transmitters in a manner that ensures that the sum of all power needs reported to different transmitters does not exceed its own power handling capabilities. Typically a receiver may order transmitters from the most suitable to least suitable, based on some criteria such as cost, range, load, capabilities, and may request a first amount of power from the most favourable transmitter. That first amount of power may typically be all of its needs, or up to the transmitter's capability, whichever is the lesser. Should there still be any power need following this step, the receiver may ask the second transmitter on the list to supply the missing amount of power, and so on.

Method E—Transmitter responsibility 1×1—information from second transmitter—the transmitter will try to communicate with other transmitters, directly or via proxy, and share data on which receivers are being powered. Transmitters will be configured to avoid powering the same receiver together.

Method F—Transmitter responsibility 1×1, information from receiver—the receiver updates the transmitter from which it is receiving power, regarding the availability of a second transmitter. The transmitters communicate and coordinate with each other to determine which transmitter powers the receiver; transmitters will be configured to avoid powering the same receiver together.

Method G—Transmitter responsibility 1×n, information from receiver—the receiver updates the transmitter from which it is receiving power, regarding the availability of a second transmitter. The transmitters communicate and coordinate with each other to determine how much power is supplied from each transmitter, and when.

Method H—Transmitter responsibility 1×n, information from receiver—the receiver updates the transmitter from which it is receiving power, regarding the availability of a second transmitter. The transmitters communicate with an external server which determines how much power and when to transmit from each transmitter.

Each of these alternative methods, other than methods A and B which involve user activation, is now described in greater detail, case by case, as follows:

Method C—Receiver responsibility 1×1—A receiver will be configured to pair with only one transmitter; the receiver may choose the optimum transmitter or the first transmitter. The optimum transmitter may be determined by power level, safety, cost, user interface or any other parameters.

Figure 2A:
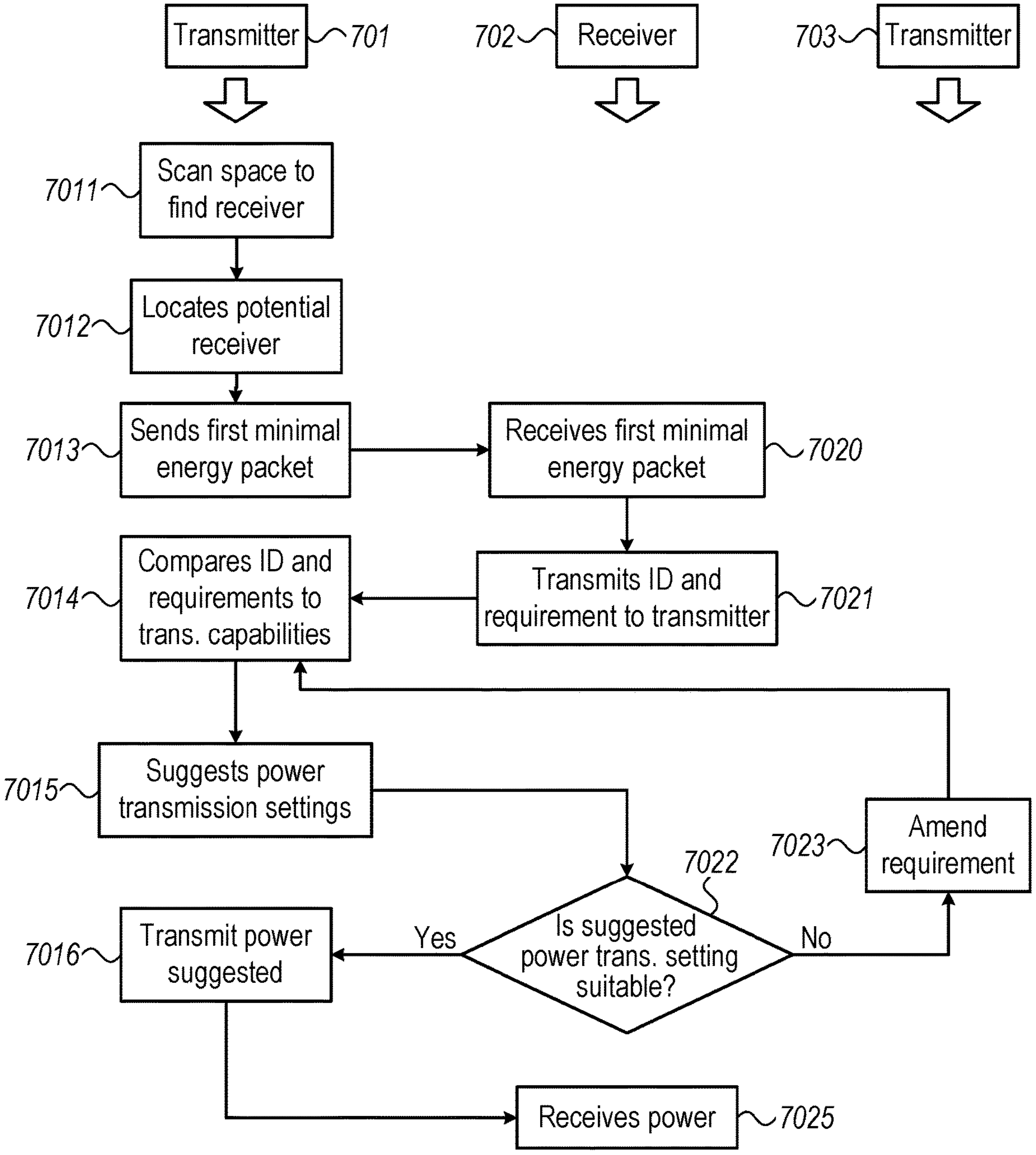
FIGS. 2A and 2B are flowcharts showing one exemplary method of arranging the interaction between two transmitters and a single receiver in accordance with a 1×1 pairing method, involving automatic selection of the transmitter by the receiver.
Figure 2B:
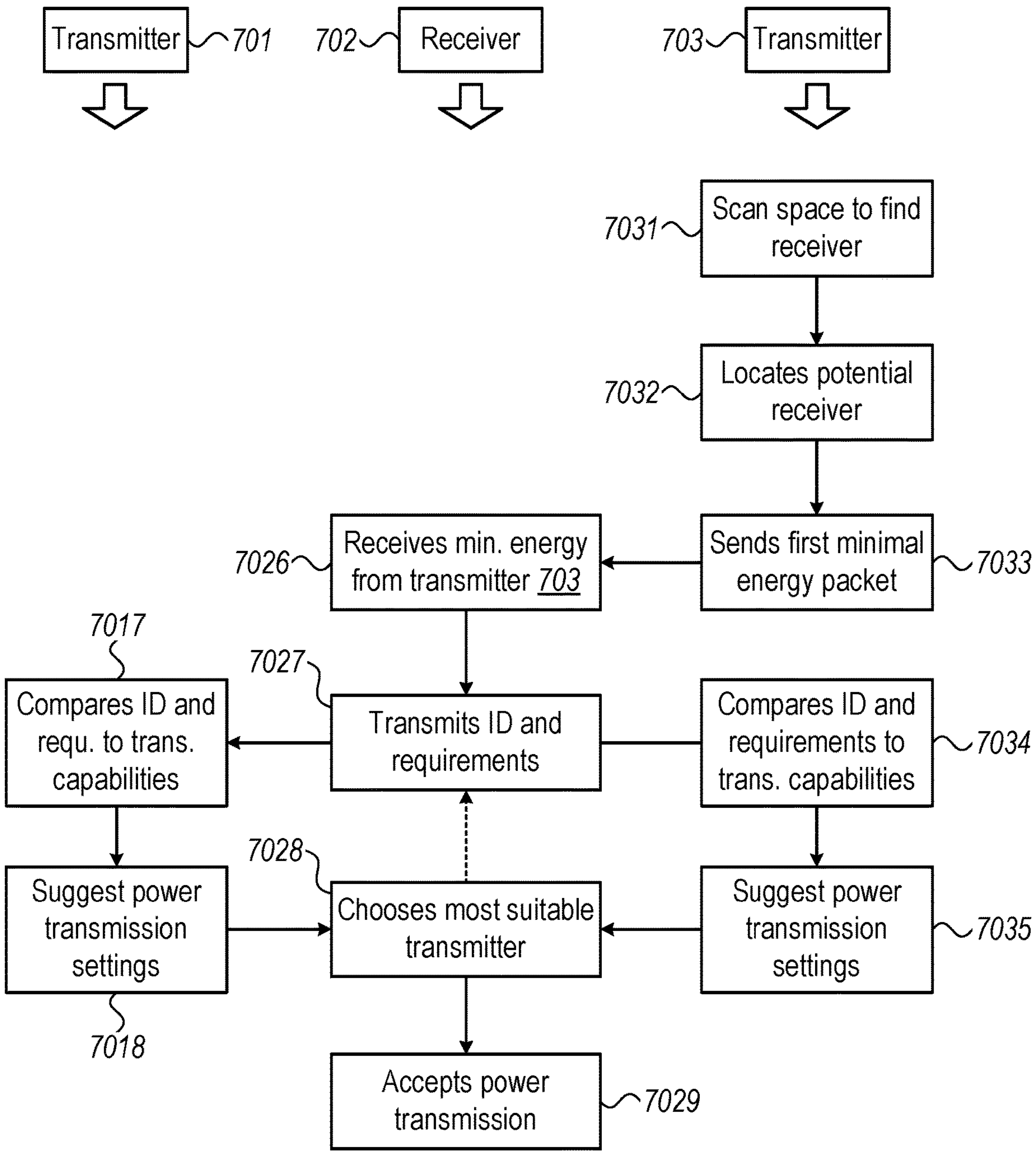

Reference is now made to FIG. 2, which shows a schematic flowchart of the interaction between two transmitters 701, 703, and a single receiver 702, in accordance with Method C (1×1 pairing, automatic selection by receiver)

In step 7011 transmitter 701 scans a portion of its field of view to locate receivers In step 7012 transmitter 701 locates receiver 702. This may be done using a retro-reflected signal from the receiver, or a camera which identifies a bar code or some other visual mark on the receiver, or it may be done by a signal such as an RF signal, generated by the receiver when the scanning beam impinges on the optical detector of the receiver.

In step 7013, transmitter 701 sends a minimal energy level packet to receiver 702

In step 7020, receiver 702 receives and recognizes the first minimal energy level, by differentiating it from the ambient illumination falling thereon, since the delivered minimum energy packet beam may have a much higher intensity level, or may have a specific wavelength which an input filter can detect, or, it may have a specific profile or a specific pulsing scheme, and responds in step 7021 to receipt of the minimal energy level packet by sending its ID and minimal capability message back to the transmitter 701.

The capabilities ID message may contain among other data:

1. Receiver ID
2. Receiver manufacturer ID
3. Receiver model identifier
4. Maximum average electrical power that can be processed by the receiver
5. Minimum average electrical power that can be processed by the receiver
6. Power channels available for the receiver
7. Maximum momentarily electrical power that can be processed by the receiver
8. Minimum momentarily electrical power that can be processed by the receiver
9. Total energy that can be received
10. Maximum average optical power that can be processed by the receiver
11. Minimum average optical power that can be processed by the receiver
12. Maximum momentarily optical power that can be processed by the receiver
13. Minimum momentarily optical power that can be processed by the receiver
14. Receiver's power conversion efficiency
15. Receiver state—which may include
    a) Power needs
    b) Battery charging data (charging capacity, temperature)
    c) Energy used by device
    d) Urgency indicator
    e) Available power sources
16. Receiver class (for example high priority, medium priority, low priority)
17. Receiver clear aperture
18. Receiver field of view
19. Receiver required safety class (residential receivers may be limited to reduced power levels compared to industrial ones)
20. Receiver public key
21. Receiver address on a network
22. Data transmitted from receiver's client (the unit receiving the data)
23. CRC or other checksum data
24. Electronic signature of the whole message.

In step 7014 transmitter 701 receives the ID and minimal capability message and responds to it in step 7015 by suggesting a set of power transmission parameters that it is able to transmit. The set of power transmission parameters may be either based on an internal database in the transmitter, an internal algorithm known to the transmitter or on data received from the receiver itself or from an external server, and may include data such as:

a. Power channels available, which may include data such as the wavelengths, power technologies, transmission protocols, frequency, duty cycle, payment methods, or a combination thereof
b. Total energy that can be received by the receiver and/or by the client device
c. Maximum average optical power
d. Minimum average optical power
e. Maximum momentary optical power
f. Minimum momentary optical power
g. Beam diameter (min, average, max)
h. Transmitter's public key
i. Transmitter's address on a network
j. CRC or other checksum data or error correction code
k. Electronic signature of the whole message.

Typically the first capability message is preprogrammed into the receiver, or the receiver selects it from a list of preprogrammed messages depending on scanning beam parameters, such as wavelength, and temporal pattern.

In step 7022, the receiver receives the suggested power transmission settings, which typically includes parameters such as power level, beam diameter, wavelength(s), duty cycle, communication channel, safety features, reporting protocol, and the like, and determines whether it is able to accept and handle the settings proposed.

If not, then in step 7023, it amends its requirements, generally by reducing them towards the suggested power transmission settings of the transmitter, and sends those reduced requirements back to the transmitter, which in step 7014, prepares an amended proposed power transmission setting, and transmits that proposal back to the receiver, which again considers it in step 7022. This iterative procedure continues until an acceptable power transmission setting is received, that is agreed-upon by both transmitter 701 and receiver 702. Once this agreed set of transmission parameters is sent back to the transmitter, in step 7016 transmitter 701 begins transmits of power to receiver 702 which accepts it in step 7025.

Such transmission will normally continue either until transmitter 701 stops transmitting, such as may result from it being turned off by a user or by a setting, or a result of transmitter 701 diverting its power to another receiver which has priority over receiver 702, or because there is a physical interruption to the power transmission.

At some point in time, another transmitter 703, while scanning the room (step 7031), finds receiver 702 (step 7032) and transmits a minimal energy level to it (step 7033) which receiver 702 accepts at step 7026

Receiver 702 responds by sending its ID and its minimal energy capability in step 7027 back too transmitter 703. Step 2027 may also include response action on the part of receiver 702 by notifying transmitter 701 of either an error or an additional transmitter found, although some receivers may not be capable of distinction between minimal energy levels from different transmitters or may not be configured to notifying transmitters on such event.

In steps 7017 and 7034, transmitter 701 and transmitter 703 compare the minimal ID message received from the receiver 702 to their own power capabilities, and in steps 7018 and 7035, each transmits its own power settings suggestion to the receiver.

Steps 7027, 7017, 7034, 7018, 7035 may be repeated until an agreement is reached, typically such agreement involves agreement on optical power level, and beam parameters, such as beam diameter and wavelength, but some of these parameters may be preprogrammed into the systems (wavelength) and no detailed negotiation of them would occur. This iterative process is similar to that shown in steps 7015, 7022, 7023 and 7014 for transmitter 701 alone, and so is not shown at this point to avoid complicating the flowchart. The receiver 702 compares the suggested parameters with its capabilities to receive and absorb power, and would typically accept conditions which allow it to be safely powered, but would reject optical power above its safe limit, or beams that are too large or too small for efficient or safe handling by a receiver of its size.

In step 7028, the receiver 702 chooses the preferred settings of either transmitter 701 or transmitter 703, based on the best match to its preprogrammed preferences, or based on pricing, user choice, or even an arbitrary choice, and in step 7029 receiver 702 accepts the power transmission settings of either transmitter 701 or transmitter 703, depending on which one has been selected by the beginning procedure when only one transmitter was in communication with the receiver.

When this process is completed, one transmitter is transmitting power to the receiver 702, and receiver 702 is accepting that power, as is achieved by the protocol of Method C.

Method D—Receiver responsibility 1×n—The receiver will report its power needs to all transmitters, making sure it does not receive more power than it can handle.

Figure 3:
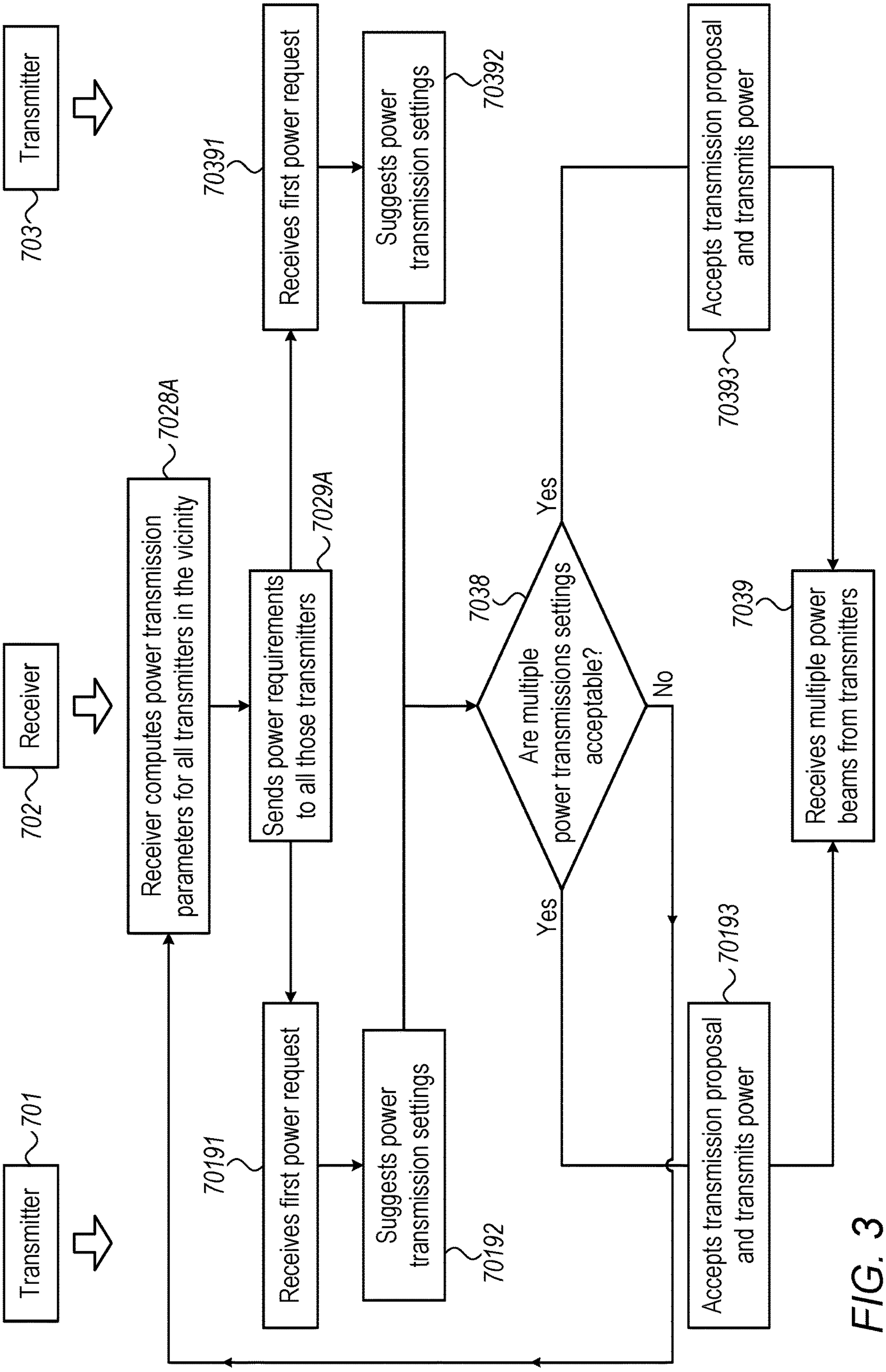
FIG. 3 is a flowchart showing another exemplary method of arranging the interaction between two transmitters and a single receiver in accordance with a different communication and operational protocol in which automatic selection of the transmitter is performed by the receiver.

Reference is now made to FIG. 3, which shows a schematic flowchart of the interaction between two transmitters and a single receiver in accordance with this Method D (1×n pairing—automatic selection by receiver)

This protocol is used when a receiver is capable of receiving power from multiple transmitters at the same time, even in an environment where transmitters are incapable of communicating which each other. This protocol involves no transmitter-to-transmitter interaction. It is the receiver that is "smart" and can send separate reports to both transmitters. Such a receiver may still be able to receive increased or optimized power from more than one transmitter. In such a scenario, the steps until 7018 and 7035 of FIG. 2 will be repeated in a similar manner but the receiver's response will differ.

As an alternative to steps 7028 and 7029 of Method C, shown in FIG. 2, in method D shown in FIG. 3, steps 7028A and 7029A are performed. In step 7028A receiver 702 computes power transmission parameters for all transmitters it is in contact with in its vicinity, and then in step 7029A transmits separate power requests to all those transmitters, which may be identified by different addresses, encoding, frequencies or by other means.

Upon receiving such requests (steps 70191 and 70391) transmitters 701 and 703 suggest power transmission settings, and transmits them to receiver 702. Receiver 702 considers these settings for suitability for its needs in step 7038. This decision is based on internal optimization parameters which may be configured to achieve a certain power level, or to optimize cost, within a set of safety limits which are preprogrammed into the receiver. Upon acceptance of a set of power transmission settings, transmitters 701 (and/or 703) transmit power, in step 70193 (and/or 70393), and receiver 702 accepts this power in step 7039. Receiver 702 can thus receive power from 701, 703 or both (but accepting it from only one is already covered in method C above). Receiver 702 thus receives multiple power beams from the transmitters, adapted to its requirements, and within the capabilities and suitabilities of the transmitters to supply that power requirement.

If on the other hand, receiver 702 rejects both of the suggested power transmission settings, control may then return to step 7028A again, in order to try an alternative suggestion scheme of amended power consideration from all of the transmitters in the vicinity.

Method E—Transmitter responsibility 1×1—information from second transmitter—the transmitter will try to communicate with other transmitters, directly or via proxy, and share data on which receivers are being powered. Transmitters will be configured to avoid powering the same receiver together.

Figure 4:
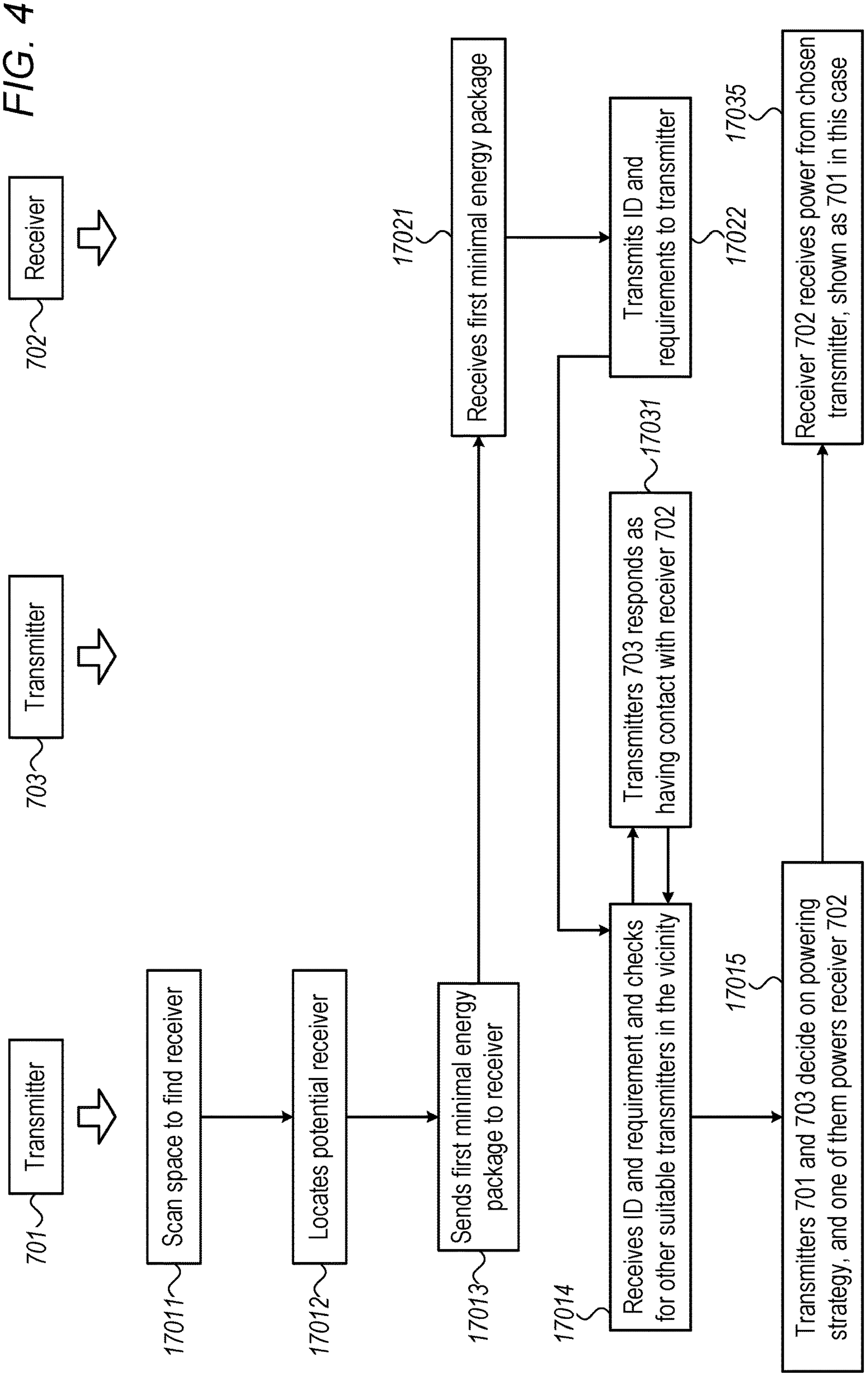
FIG. 4 is a flowchart showing an exemplary method of arranging the interaction between a single receiver and multiple transmitters, where decisions are made by one of the transmitters or by an external server.

Reference is now made to FIG. 4, which shows a flowchart of the interaction between a single receiver and multiple transmitters, where decisions are made by one of the transmitters or by an external server. FIG. 4 is also relevant to methods F, G, and H.

In step 17011 transmitter 701 scans the room, finding receiver 702 on step 17012 and transmits a minimal energy to it on step 17013. Receiver 702 receives the minimal energy in 17021 and transmits its ID and requirements in step 17022.

Having received the ID and requirements, transmitter 701 communicates with other transmitters in the vicinity in step 17014, to determine a single transmitter (or multiple transmitters in accordance with methods G and H) that will transmit power to receiver 702. Such a transmitter having relations with receiver 702, is indicated in step 17031. Such a decision can be made by an optimization algorithm, random choice, or some other algorithm which may take into account line of sight, power capabilities, power needs, load, range, safety, cost and compatibility of that or those transmitters with receiver 702.

The decision can be made based on a quality criteria (such as line of sight, load, or other criteria) or based on a first-to-detect mechanism, or in some other manner (random, communications to server, preferred transmitter).

Once the selected optimum transmitter has been decided upon in step 17015 (transmitter 701 in the example shown in FIG. 4), the selected transmitter locates the receiver, and powers it in step 17035, possibly after exchanging some more information with the non-selected transmitter 703.

Method E and Method F differ in that in method E information about the existence of a second transmitter is achieved either by communication between transmitters or by user input into the transmitters.

In Method F information about the existence of a second transmitter is indicated by the receiver in its communication with the transmitters.

Both methods can coexist.

In Method G and Method H multiple transmitters power the receiver at the same time, dividing the power needs between them.

Methods G and H differ in that in method H transmitters communicate with an external server to determine the operational parameters.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:

1. A system for transmission of optical power to at least one receiver located in a remote volume, said system comprising:

at least one optical power transmitter configured, following detection of said at least one receiver in the remote volume, to emit from a single beam emitter, a single beam, said single beam containing a first safe minimal amount of energy allotment which is predetermined to be sufficient to power up the at least one receiver, to enable the at least one receiver to report an identification to the at least one optical power transmitter, wherein said at least one optical power transmitter is further configured, on receipt of said identification from said at least one receiver, either (a) to deny power transmission to said at least one receiver or (b) to cause said single beam emitter to direct the single beam, now conveying a second amount of energy, to said at least one receiver, based on at least one of (i) the receiver identification or (ii) the power requirements received by said at least one optical power transmitter from said at least one receiver.

2. The system of claim 1, wherein the at least one receiver has an identifying pattern which can be detected by said at least one optical power transmitter in order to qualify the at least one receiver as a potentially legitimate receiver.

3. The system according to claim 2 wherein said identifying pattern is optical.

4. The system according to claim 2 wherein said identifying pattern results from a retroreflection from at least one receiver.

5. The system according to claim 1 wherein at least one of said receivers comprises at least one filter causing it to be capable of receiving power from transmitters matching a characteristic of said at least one filter.

6. The system according to claim 1 wherein said at least one optical power transmitter is adapted to transmit power to at least one of said receivers, said power being at a level which is less than the power reception capabilities of said at least one receiver, and less than the power reception capabilities of said at least one receiver's power client(s) and less than the maximal safe power transmission limit of said optical power transmitter.

7. The system according to claim 1 wherein said at least one optical power transmitter is adapted to determine a transmission profile of power to be transmitted, based on data received from at least one of said receivers.

8. The system according to claim 7 wherein said transmission profile is generated from an algorithm processed in said at least one optical power transmitter, or in a device in communication therewith.

9. The system according to claim 1 wherein said at least one optical power transmitter is at least two transmitters, and at least one of said receivers is adapted to report its power needs to all of said at least two transmitters, so that the sum of all power needs requested by that at least one receiver does not exceed the maximal power handling capabilities of said receiver.

10. The system according to claim 1, wherein the identification further comprises at least the energy requested by the at least one receiver from the at least one optical power transmitter, and the capability of the at least one receiver to handle the energy it will receive from the at least one optical power transmitter.

11. A system for wireless transmission of power over a field of view to at least one receiver, said system comprising:

at least one transmitter, configured to emit, after detection of said at least one receiver in its field of view, a beam providing a first minimal energy allotment for reception by said at least one receiver, and, following receipt of a response from said at least one receiver, the beam providing a second amount of energy to said at least one receiver, said at least one transmitter configured to receive data contained in a data beam generated and transmitted from said at least one receiver, said data comprising at least one of (i) an ID and (ii) power requirements of said receiver, wherein, when any of said receivers are in a sleeping mode, said first minimal energy allotment emitted by said transmitter is configured to wake up said at least one receiver, causing said at least one receiver to respond with said data beam generation and transmission to said at least one transmitter, such that said at least one receiver does not require use of stored receiver energy prior to receiving said first minimal energy allotment, and wherein said at least one transmitter is configured to perform one of (a) denying power transmission to said at least one receiver and (b) causing said at least one transmitter to direct said beam conveying said second amount of energy to said at least one receiver, based on said at least one of (i) the ID and (ii) power requirements received by said at least one transmitter from said at least one receiver.

* * * * *